United States Patent
Bowen

(10) Patent No.: US 9,366,821 B2
(45) Date of Patent: Jun. 14, 2016

(54) METHOD OF FORMING FUSED COUPLER

(75) Inventor: Terry Patrick Bowen, Dillsburg, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 68 days.

(21) Appl. No.: 13/410,817

(22) Filed: Mar. 2, 2012

(65) Prior Publication Data
US 2013/0230281 A1 Sep. 5, 2013

(51) Int. Cl.
G02B 6/26 (2006.01)
G02B 6/28 (2006.01)
G02B 6/02 (2006.01)

(52) U.S. Cl.
CPC .......... *G02B 6/2835* (2013.01); *G02B 6/02042* (2013.01); *G02B 6/02328* (2013.01); *G02B 6/02338* (2013.01); *G02B 2006/2839* (2013.01)

(58) Field of Classification Search
CPC ............... G02B 6/26; G02B 6/02; G02B 6/00
USPC .......................................................... 385/43
See application file for complete search history.

(56) References Cited

U.S. PATENT DOCUMENTS

| | | | | |
|---|---|---|---|---|
| 4,336,047 A * | 6/1982 | Pavlopoulos et al. | ............ | 65/392 |
| 4,756,589 A * | 7/1988 | Bricheno et al. | .................. | 385/39 |
| 4,842,359 A * | 6/1989 | Imoto et al. | ....................... | 385/46 |
| 4,979,972 A * | 12/1990 | Berkey et al. | .................... | 65/408 |
| 5,150,439 A * | 9/1992 | Hill et al. | ......................... | 385/39 |
| 5,175,779 A * | 12/1992 | Mortimore | ....................... | 385/43 |
| 5,809,189 A * | 9/1998 | Murphy et al. | .................. | 385/43 |
| 6,181,466 B1 * | 1/2001 | Franzoso et al. | ............ | 359/341.3 |
| 6,631,234 B1 * | 10/2003 | Russell et al. | ................. | 385/125 |
| 6,718,107 B1 * | 4/2004 | Payne et al. | .................... | 385/126 |
| 7,455,464 B2 * | 11/2008 | Tammela et al. | ............... | 385/95 |
| 7,742,665 B2 * | 6/2010 | Digonnet et al. | ............... | 385/43 |
| 8,009,948 B2 * | 8/2011 | Digonnet et al. | ............... | 385/43 |
| 8,244,086 B2 * | 8/2012 | Digonnet et al. | ............... | 385/43 |
| 2002/0054740 A1 * | 5/2002 | Vakili et al. | ..................... | 385/115 |
| 2003/0081918 A1 * | 5/2003 | Sakabe et al. | .................. | 385/102 |
| 2007/0237453 A1 * | 10/2007 | Nielsen et al. | ................... | 385/28 |
| 2008/0050078 A1 * | 2/2008 | Digonnet et al. | ............. | 385/125 |
| 2008/0298741 A1 * | 12/2008 | Zalevsky | .......................... | 385/12 |
| 2009/0052852 A1 * | 2/2009 | Minkovich et al. | ............ | 385/125 |
| 2010/0296093 A1 * | 11/2010 | Digonnet et al. | ............. | 356/432 |
| 2011/0273712 A1 * | 11/2011 | Digonnet et al. | ............. | 356/432 |

FOREIGN PATENT DOCUMENTS

| | | |
|---|---|---|
| JP | H02212803 A | 8/1990 |
| WO | 99/41628 A1 | 8/1999 |
| WO | 02/090277 A1 | 11/2002 |

OTHER PUBLICATIONS

Tjugiarto T et al: "Bandpass Filtering Effect in Tapered Asymmetrical Twin-Core Optical Fibres", Electronic Letters, IEEE Stevenage, GB, vol. 29, No. 12, Jun. 10, 1993, pp. 1077-1078.
PCT International Search Report issued in corresponding PCT application No. PCT/US2013/025484 dated May 3, 2013.

* cited by examiner

*Primary Examiner* — Kaveh C Kianni

(57) ABSTRACT

A method of forming a coupler, the method comprising: (a) heating a portion of an optical fiber having multiple cores and an initial diameter; and (b) applying a tensile force across the portion such that the portion stretches, thereby reducing the initial diameter to a reduced diameter sufficient to cause optical signals propagating in one or more of the multiple cores to leave their respective cores and enter other cores of the fiber.

15 Claims, 3 Drawing Sheets

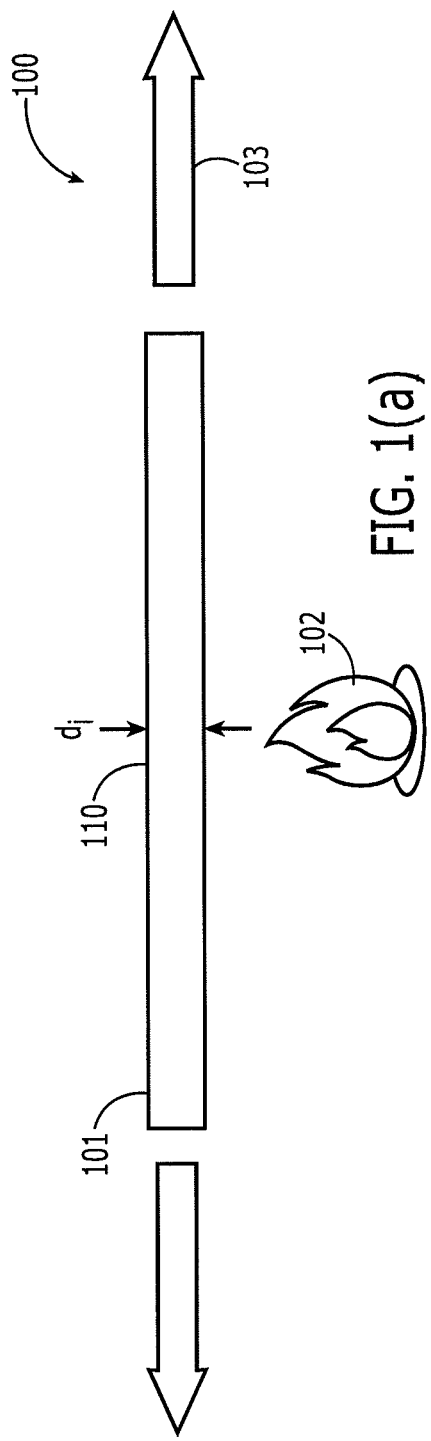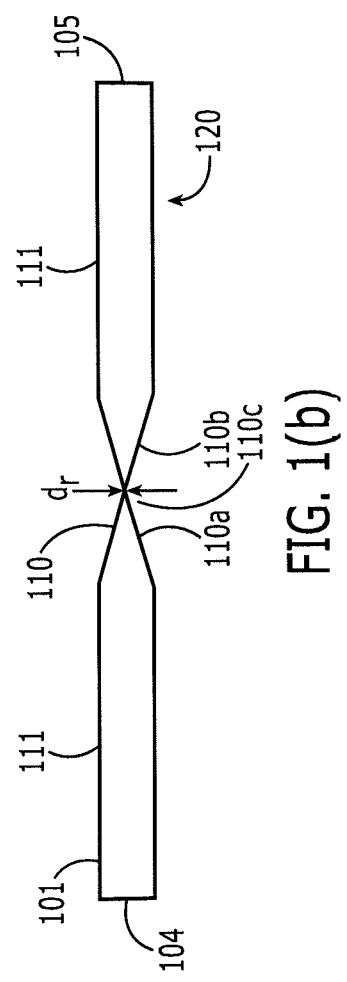

METHOD OF FORMING FUSED COUPLER

FIELD OF INVENTION

The present invention relates generally to fused optical couplings, and, more specifically, to a method of using a multi-core fiber to produce fused optical couplings.

BACKGROUND OF INVENTION

Fused couplers are important passive components in fiber optic communication systems, and perform functions such as light branching and splitting in passive networks, wavelength multiplexing/de-multiplexing, filtering, polarization selective splitting and wavelength independent splitting.

Fused couplers are formed traditionally by joining two or more independent optical fibers in which the claddings of the fibers are fused over a small region. The devices work as a result of energy transfer between the optical fiber cores on the basic principle of coupling between bi-conically tapered optical waveguides.

Critical in the manufacture of fused couplers, such as those disclosed in U.S. Pat. Nos. 5,175,782, 5,339,374 and 5,644,666, is the need to arrange the various fibers precisely during the fusing process. Specifically, optical fibers or optical fiber preforms are mechanically grouped into an array to control the mechanical geometry of the optical cores in the fibers while heating to fuse them in a biconical taper structure. The biconical taper structure has a down taper and an up taper formed by pulling with tension on the grouped fibers or preform bundle while controlling the heating and cooling cycle. Mechanical control of the geometry of the optical cores while fabricating the biconical taper structure is difficult, yet critical. Holding the fibers in a precise arrangement is especially difficult as the number of fiber increases. This difficulty increases the complexity of equipment used in manufacturing fused couplings and results in increased waste owing to the inevitability of occasionally failing to maintain such precise fiber arrangement.

Therefore, a need exists for a simplified method of producing fused optical couplings. The present invention fulfills this need among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention is directed to a simplified method of forming a fused optical coupler by using a multi-core optical fiber in which the cores are already arranged precisely. Specifically, applicant recognizes that the complexity encountered in the traditional manufacture of fused optical couplings is due primarily to the need to maintain the various fibers in a precise arrangement during the fusing process. Applicant also recognizes that such a precise arrangement of fibers is already achieved essentially in a multi-core optical fiber in which the various cores are precisely held within a common cladding. Thus, the common cladding holds the multiple cores in precise alignment which eliminates the need to arrange and maintain the precise alignment of the fibers, thus greatly simplifying the manufacture of such couplings.

One aspect of the present invention is a method for forming a coupling from a multi-core optical fiber. In one embodiment, the method comprises: (a) heating a portion of an optical fiber having multiple cores and an initial diameter; and (b) applying a tensile force across said portion such that said portion stretches thereby reducing said initial diameter to a reduced diameter sufficient to cause optical signals propagating in one or more of said multiple cores to leave their respective cores.

Another aspect of the invention is a fused coupler made from the process described above. In one embodiment, the fused coupler comprises a multi-core optical fiber having ends of an initial diameter and a tapered portion of a reduced diameter.

BRIEF DESCRIPTION OF DRAWINGS

FIGS. 1(a) and 1(b) show schematically the process steps of one embodiment of the method of the present invention.

DETAILED DESCRIPTION

Figure 2A:
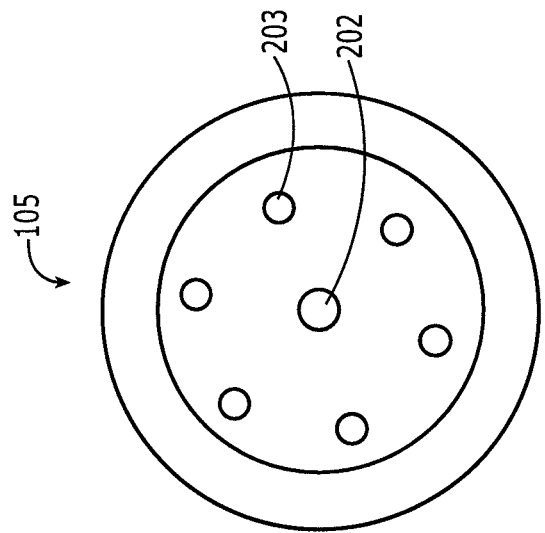
FIGS. 2(a) and 2(b) show the first and second ends of a fused coupler of the present invention.

Referring to FIGS. 1(a) and 1(b), one embodiment of the method 100 of the present invention is shown for forming a coupler 120. The method comprises: (a) heating a portion 110 of an optical fiber 101 having multiple cores 201 (see FIG. 2(a)) and an initial diameter di; and (b) applying a tensile force 103 across said portion 110 such that said portion 110 stretches, thereby reducing said initial diameter $d_i$ to a reduced diameter $d_r$ sufficient to cause optical signals propagating in one or more of said multiple cores 201 to leave their respective cores. The various elements and alternative embodiments of this method are described in greater detail below.

Figure 3:
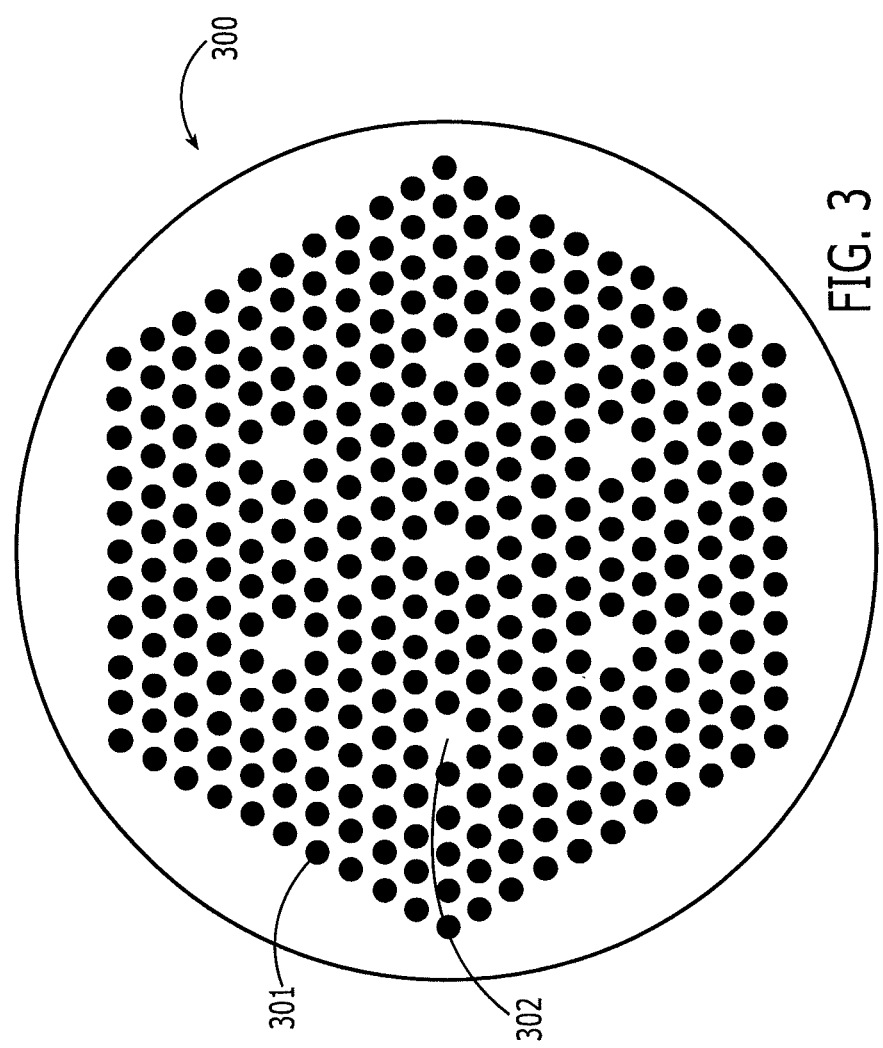
FIG. 3 shows another embodiment of a multi-core fiber in which the individual cores are defined by a pattern of air channels in the fiber.

A key aspect of the invention is the use of a multi-core fiber 101. Multi-core fibers are known in the art and comprise two or more cores in a common fiber. Suitable multi-core fibers include, for example, fibers having multiple cores in a common cladding as shown in FIGS. 2(a) and (b), which are available from, for example, Corning Inc, OFS—Furukawa Electric Ltd, and Sumitomo Electric Ind. Alternatively, rather than defining the cores in a common cladding the cores may be defined by air channels running the length of the fiber. Cores defined in this way are referred to as photonic crystal structure cores or holey fiber cores. For example, referring to FIG. 3, a cross section of such a fiber 300 is shown in which multiple air channels 301 define discrete photonic crystal structure cores 302 in the fiber. Such fibers are described, for example, in KAZUNORI MUKASA, ET AL., *Multi-Core Fibers for Large Capacity SDM*, Optical Fiber Conference 2011, OWJ1, hereby incorporated by reference.

Different configurations of multi-core optical fibers may be used in practicing this invention. For example, in one embodiment, as shown in FIG. 2a, seven cores 201 are shown, in which a plurality of perimeter cores 203 are arranged in a circular pattern around a center core 202. Alternatively, cores may be arranged in concentric rings, or in a simple circular pattern. Yet other patterns are well within the scope of the invention. The cores may be designed to support a single optical mode or to support multiple optical modes and may be formed of solid or photonic crystal structures. In one embodiment, the cores are arranged to be equidistant to each other, as shown, for example, in FIGS. 2(a) and 3, in which each of the seven cores is equidistant to each other. Generally, although not necessary, it is preferred that the cores be equidistant from each other such that optical coupling is similar among all the cores. As multi-core fibers continue to evolve, applicant expects that the density of cores within a given cladding will increase.

As shown in FIG. 1(a), a portion 110 of the multi-core fiber 101 is heated with a heat source 102 to facilitate elongation and the reduction in the diameter of the fiber. Heating of fiber is known and may involve, for example, the use of burners, electric arcs and lasers. Generally, it is preferred, although not necessary, that the heating be uniform around the entire portion of the fiber 101. To this end, multiple heat sources 102 may be used to ensure uniformity. Again, this is a known technique. The portion is heated to a certain temperature sufficient to cause the optical fiber to reach its softening point.

In one embodiment, a tensile force 103 is applied across the portion 110 while it is being heated. Once the portion reaches the certain temperature and it begins to soften, the tensile force must be sufficient to elongate or stretch the portion. Such tensile force is readily determined by one of skill in the art.

The fiber must be stretched and elongated such that the initial diameter $d_i$ of the fiber is reduced to a reduced diameter $d_r$, as shown in FIG. 1(b). As is known, elongating the fiber to reduce its diameter will, in turn, reduce the diameter of the cores within. The cores must be reduced in diameter such that a light signal of a particular wavelength is forced to leave the cores and enter the common area around the cores, for example, the common cladding of the fiber 201. Specifically, when a light signal is propagating down a single mode core, it does so in the fundamental core mode, which has a particular diameter. Once the propagating signal enters the down taper 110a of portion 110 (see FIG. 1(b)), it encounters a gradually diminishing core dimension, which results in a progressive change in the field distribution of the local fundamental mode along the taper.

Eventually the mode spreads further into the cladding region. Specifically, for any given signal wavelength and core-cladding refractive index profile, there is a core diameter at which the signal has effectively escaped from the core guidance and is then guided by the interface between the cladding and the external medium (such as air). This point is called the taper transition. Beyond the taper transition, the fiber is capable of supporting more than one mode since (i) the diameter of the cladding, which now forms the transitional core, is much larger than the un-tapered core radius and (ii) the corresponding refractive index difference between the cladding and external medium (air) can be very large. Hence, the signals in the tapered portion 110 can become multimoded.

As the light propagates beyond the waist 110c of the taper (i.e., the point of minimum cross section of the tapered portion 110), it encounters the up-taper 110b, in which the size of the cores progressively increase. The signal enters the up-taper 110b guided by the cladding air-boundary, and the fiber is still capable of supporting more than one mode. When the signal reaches the taper transition point (symmetrically located on the other side of the waist 110c), the light begins to be guided again by the cores increasing dimension.

Although the degree of radius reduction to ensure a taper transition point depends on the wavelength of the signal and the relative refractive indices of the core and cladding, suitable results have been obtained generally with a ratio of initial diameter to reduce diameter of 3:1 to about 15:1.

Figure 2B:
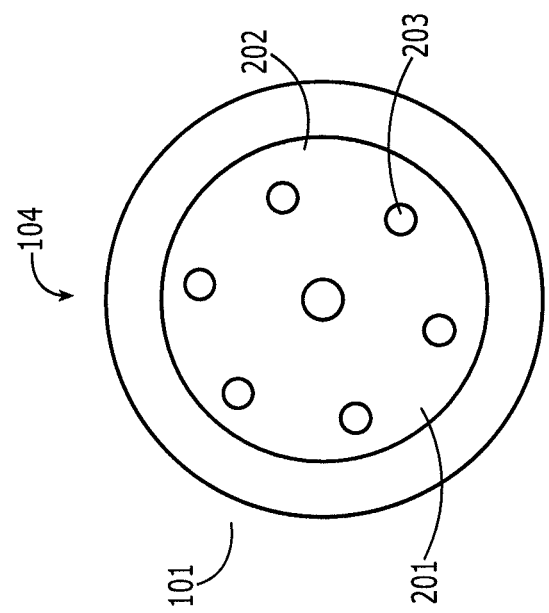

In one embodiment, one or more cores are monitored to determine when optical coupling between the cores is achieved, and, thus, when the elongation/reduction in diameter is sufficient. Referring to FIG. 1(b), monitoring generally requires inputting a signal into a particular core at the first end 104 and monitoring the second end 105 to determine when the signal from the particular core is coupled to the other cores. Specifically, referring to FIGS. 2(a) and 2(b), in one embodiment, a signal is transmitted down a central core 202 at the first end 104 and one or more perimeter cores 203 are monitored at the second end 105 to determine when the signal initially transmitted down the central core 202 is optically coupled with the perimeter cores 203. Once the optical coupling occurs, the elongation may be stopped and the fiber cooled.

Although monitoring all the perimeter cores 203 may be performed to ensure that optical coupling across all of them is sufficient, in one embodiment, just one of the perimeter cores is monitored because of the symmetrical relationship of all the cores. In other words, because all of the cores are arranged equidistant, when a certain optical coupling ratio is achieved between two of them, then predictable optical coupling is likely achieved among the rest of them.

In one embodiment, the process described above is performed using a common tool. For example, in one embodiment, a traditional optical coupler manufacturing tool, such as the OC-2010 available from Nanjing Jilong Optical Communication Company is programmed to practice the method of the present invention. Alternatively, a traditional fusion splice tool may used such as the Fujikura FSM-50S Fusion Splicer System. Specifically, the fusion splice tool is modified such that, rather than heating and pushing two fibers together to fuse them, it heats a common fiber and simply pulls it apart to elongate it. However, because the cores are pre-arranged within a single fiber, there is no need for complex mechanisms to arrange and control multiple fibers as described above.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. A method of forming a coupler, said method comprising:
heating a portion of an optical fiber having multiple cores and an initial diameter, said cores being defined in a common cladding, said cores being essentially the same in at least size and shape, but having different positions in said common cladding, said multiple cores being disposed symmetrically about a center axis; and
applying a tensile force across said portion such that said portion stretches, thereby reducing said initial diameter to a reduced diameter sufficient to cause an optical signal propagating in a first core of said multiple cores to leave said first core and enter a second core of said multiple cores of the fiber.

2. The method of claim 1, wherein the ratio of said initial diameter to said reduced diameter ranges from about 3:1 to about 15:1.

3. The method of claim 1, wherein said multiple cores are single mode cores.

4. The method of claim 1, wherein said multiple cores are multimode cores.

5. The method of claim 1, wherein said multiple cores comprise at least four cores.

6. The method of claim 1, further comprising monitoring said first and second cores during step (b) to determine when said optical signal enters said second core.

7. The method of claim 6, wherein said multiple cores comprise perimeter cores around a center core.

8. The method of claim 7, wherein said first and second cores comprise said center core and a perimeter core.

9. The method of claim 7, wherein monitoring said optical signal comprises monitoring only said center core and one of said perimeter cores.

10. The method of claim 1, wherein heating and applying force are performed using a single tool.

11. The method of claim 10, wherein said single tool is a fusion tool which pulls a single fiber.

12. The method of claim 10, wherein said single tool is a fusion coupler manufacturing system.

13. The method of claim 9, wherein said first core is said center core.

14. The method of claim 1, wherein one core of said multiple cores is disposed at the center axis and the remaining cores are positioned at a common radius from the center axis.

15. The method of claim 1, wherein said multiple cores are arranged to be equidistant to each other.

* * * * *